United States Patent
Bendi et al.

(10) Patent No.: US 9,313,627 B2
(45) Date of Patent: Apr. 12, 2016

(54) MULTIMEDIA MESSAGING SERVICE (MMS) ORIGINATOR AUTHENTICATION

(71) Applicant: Cellco Partnership, Basking Ridge, NJ (US)

(72) Inventors: Sethumadhav Bendi, Walnut Creek, CA (US); Amol Tuli, Dublin, CA (US); Brian Libonate, Walnut Creek, CA (US); Paul H. Prehn, Clayton, CA (US)

(73) Assignee: Cellco Partnership, Basking Ridge, NJ (US)

( * ) Notice: Subject to any disclaimer, the term of this patent is extended or adjusted under 35 U.S.C. 154(b) by 64 days.

(21) Appl. No.: 14/274,932

(22) Filed: May 12, 2014

(65) Prior Publication Data

US 2015/0327030 A1 Nov. 12, 2015

(51) Int. Cl.
| | |
|---|---|
| *H04W 4/12* | (2009.01) |
| *H04W 8/20* | (2009.01) |
| *H04L 12/58* | (2006.01) |
| *H04L 29/12* | (2006.01) |
| *H04L 29/06* | (2006.01) |

(52) U.S. Cl.
CPC .................. *H04W 4/12* (2013.01); *H04L 51/38* (2013.01); *H04L 61/256* (2013.01); *H04L 63/0892* (2013.01); *H04W 8/20* (2013.01)

(58) Field of Classification Search
None
See application file for complete search history.

(56) References Cited

U.S. PATENT DOCUMENTS

| | | | | |
|---|---|---|---|---|
| 2005/0186974 A1* | 8/2005 | Cai | ........................ | H04L 12/585 455/466 |
| 2005/0278620 A1* | 12/2005 | Baldwin | .................. | H04L 51/12 715/201 |
| 2007/0226367 A1* | 9/2007 | Cai | ........................ | H04L 12/585 709/238 |
| 2008/0167024 A1* | 7/2008 | Zabawskyj | ........... | G06Q 10/107 455/417 |
| 2010/0070761 A1* | 3/2010 | Gustave | ................. | H04L 9/3247 713/156 |
| 2011/0227702 A1* | 9/2011 | Park | ....................... | H04W 4/185 340/10.1 |

* cited by examiner

*Primary Examiner* — Kimberly A Williams (57) ABSTRACT

A multimedia messaging service (MMS) center (MMSC) receives an MMS message associated with forwarding multimedia content, associated with a source device, to a recipient device. The multimedia content is tagged with tagging data that is generated based on a numerical key. The MMSC parses the modified MMS message to determine the source device and the tagging data. MMSC uses the tagging data to determine the sending device using the tagging data. For example, the MMSC may access an identifier for the sending device, as stored by a subscriber profile controller, using the tagging data and/or a Lightweight Directory Access Protocol (LDAP) interface. The MMSC determines whether the source device associated with the MMS message corresponds to the sending device (e.g., whether the MMS message correctly identifies the sending device), and the MMSC discards the MMS message when the source device and the sending device differ.

20 Claims, 7 Drawing Sheets

MULTIMEDIA MESSAGING SERVICE (MMS) ORIGINATOR AUTHENTICATION

BACKGROUND

A sending device, such as a smart phone, may transmit multimedia content using a multimedia messaging service (MMS). For example, an MMS message may carry videos, pictures, and audio content captured or otherwise acquired by the sending device. The MMS message may include identifying information associated with the sending device, and the MMS message may be handled based on the identifying information. For example, the identifying information may be used to charge a subscriber, associated with the sending device, for the MMS message.

DETAILED DESCRIPTION OF PREFERRED EMBODIMENTS

The following detailed description refers to the accompanying drawings. The same reference numbers in different drawings may identify the same or similar elements.

In systems and methods described herein, a multimedia messaging service (MMS) center (MMSC) may receive an MMS message associated with forwarding multimedia content, associated with a source device, to a recipient device. The multimedia content may be tagged with (i.e., include) tagging data that is generated based on a numerical key. For example, the tagging data may be generated using a one-way cryptographic hash function. The MMSC may parse the modified MMS message to determine the identifier for the source device and the tagging data. MMSC may use the tagging data to obtain the identifier for the sending device using the tagging data. For example, the MMSC may access the identifier for the sending device, as stored by a subscriber profile controller, using the tagging data and/or a Lightweight Directory Access Protocol (LDAP) interface. The MMSC may determine whether the source device corresponds to the sending device (e.g., whether the MMS message correctly identifies the sending device). The MMSC may discard the MMS message when the source device and the sending device differ, and the MMSC may process the MMS message when the sending device and the source device are the same to enable the recipient device to access the multimedia content.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data. Furthermore, the term "device" as used herein is intended to be broadly interpreted to include an apparatus and/or a user (or subscriber) associated with the apparatus.

Figure 1:
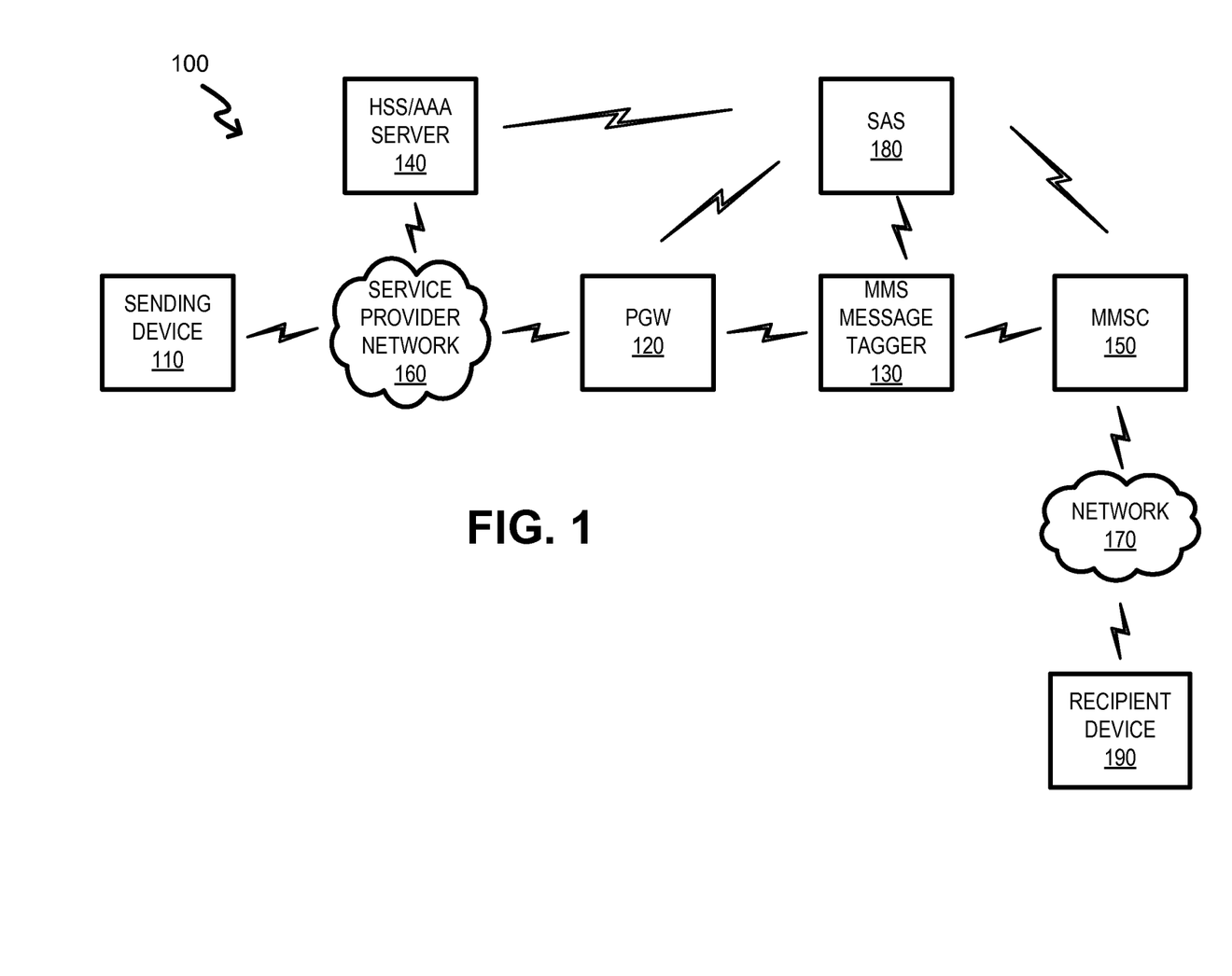
FIG. 1 is a diagram of an exemplary environment in which systems and/or methods, described herein, may be implemented.

FIG. 1 is a diagram of an exemplary environment 100 in which systems and/or methods, described herein, may be implemented. As shown in FIG. 1, environment 100 may include a sending device 110, a packet data network gateway (PGW) device 120, an MMS message tagger 130, a home subscriber/authentication, authorization, and accounting server (HSS/AAA) 140), an MMS center (MMSC) 150, a service provider network 160, a network 170, a subscriber authorization server (SAS 180), and a recipient device 190.

Each of sending device 110 and recipient device 190 may include any computation or communication device that is capable of communicating via service provider network 160 and/or network 170. For example, each of sending device 110 and recipient device 190 may include a cellular telephone, a personal communications system (PCS) terminal (e.g., that may combine a cellular telephone with data processing and data communications capabilities), a personal digital assistant (PDA) (e.g., that can include a telephone, a pager, Internet/intranet access, etc.), a laptop computer, a personal computer, tablet computer, a landline telephone, a set top box (STB), a television, a camera, a personal gaming system, or another type of computation and communication device. Although the following description generally refers to sending device 110 as a wireless mobile communication device, it should be appreciated that sending device 110 may be any type of user device.

PGW 120 may include one or more network devices, or other types of computation and communication devices, that gather, process, search, store, and/or provide information in a manner described herein. For example, PGW 120 may include a gateway, a router, a switch, a firewall, a network interface card (NIC), a hub, a bridge, a proxy server, an optical add-drop multiplexer (OADM), or some other type of device (e.g., a home agent (HA)) that processes and/or transfers traffic (e.g., packets). In one example implementation, PGW 120 may include a device that aggregates traffic received from one or more user devices 110, and sends the aggregated traffic toward MMS message tagger 130. Alternatively, or additionally, PGW 120 may receive traffic from MMS message tagger 130 (e.g., from MMSC 150) and may send the traffic toward sending device 110. PGW 120 may perform a network address translation (NAT) operation on an MMS message received from sending device 110. Additionally or alternatively, PGW 120 may extract, from the MMS message, information about sending device 110, and PGW 120 may communicate with HSS/AAA server 140 to authenticate sending device 110 based on the information extracted from the MMS message. PGW 120 may generate NAT bindings as a result of the NAT operation and may transmit, as session information, information associated with NAT bindings and/or the information associated with sending device 110.

MMS message tagger 130 may include one or more computation and communication devices that add tagging data to one or more packets associated with the MMS message to form a modified MMS message. MMS message tagger 130 may receive the MMS message and/or the session information and may generate the tagging data based on the information associated with sending device 100 (e.g., information obtained from the session information). MMS message tagger 130 may insert the tagging data into a packet header, trailer, payload, etc. of the one or more packets associated with the MMS message. MMS message tagger 130 may transmit the modified MMS message to MMSC 150, and MMSC 150 may use the tagging data to verify that the MMS message was sent by sending device 110 identified in the MMS message. MMS message tagger 130 is described in greater detail below with respect to FIG. 2.

HSS/AAA server 140 may include one or more server devices, or other types of computation and communication devices, that manage and/or store a subscriber profile associated with sending device 110. The subscriber profile may identify, for example, services for which the subscriber has subscribed, applications used by the subscriber, a usage history, subscriber preferences, etc. For example, the subscriber profile may indicate whether the sending device 110 is authorized for forwarding an MMS message to recipient device 190. Additionally or alternatively, HSS/AAA server 140 may perform AAA operations when registering sending device 110 with service provider network 160. Additionally or alternatively, HSS/AAA server 140 may authenticate sending device 110 based on information received from PGW 120 and/or MMS message tagger 130.

MMSC 150 may include one or more devices to process the modified MMS message received from PGW 120. In implementations described herein, MMSC 150 may extract the tagging data and identification data from one or more packets in the modified MMS message, and MMSC 150 may use this data to authenticate sending device 110. For example, MMSC 150 may extract the tagging data and data identifying a source device that obtains and/or captures the multimedia content from the packet. MMSC 150 may forward an authentication request to SAS 180 that includes the tagging data and/or identification data, and MMSC 150 may receive a reply from SAS 180 regarding whether the identification data, extracted from the MMS message, conforms to device data associated with the tagging data.

If MMSC 150 determines that the MMS message correctly identifies sending device 110, MMSC 150 may process the MMS message for delivery of associated multimedia content to recipient device 190. For example, MMSC 150 may extract the multimedia content from the MMS message, format the multimedia content to be compatible with recipient device, store the multimedia content, and forward a location identifier (e.g., a uniform resource locator (URL)) for the stored multimedia content to recipient device 190. Recipient device 190 may use the location identifier to access the stored multimedia content, and the MMSC 150 may initiate a charge to sending device 110 using the device identification information included in the MMS message. MMSC 150 may further perform access control to prevent access to the multimedia content by another device that differs from recipient device 190.

Alternatively, if MMSC 150 determines that the MMS message incorrectly identifies sending device 110 (e.g., if the reply message from SAS 180 indicates that the tagging data is associated with a source device that differs from sending device 110), MMSC 150 may discard the MMS message and/or send a rejection message to sending device 110. If more than a threshold number of MMS messages from sending device 110 are rejected over a time period, MMSC 150 may block other MMS messages from sending device 110 (e.g., without analyzing tagging data in the other MMS messages).

In one implementation, MMSC 150 may remotely access SAS 180 via an internet protocol (IP) network (e.g., network 170) using Lightweight Directory Access Protocol (LDAP) interface. LDAP is an application protocol for querying and modifying directory services running over TCP/IP. As described in greater detail below, SAS 180 may generate and maintain a directory of identifying data (e.g., an MDN, short code, email address, service level, etc.) associated with sending device 110, and SAS 180 may be used by PGW 120 and/or HSS/AAA server 140 to validate sending device 110 (e.g., to determine whether the sending device 110 is allowed to send an MMS message). In another implementation, a database with the identifying data may be maintained by MMSC 150. For example, MMSC 150 may acquire stored identifying data from SAS 180.

Service provider network 160 may include one or more wired and/or wireless networks via which sending device 110 may communicate and/or receive content. For example, service provider network 160 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally or alternatively, service provider network 160 may include a wide area network (WAN), a metropolitan area network (MAN), an ad hoc network, an intranet, a fiber optic-based network, and/or a combination of these or other types of networks.

Network 170 may include one or more wired and/or wireless networks. For example, network 170 may include a cellular network, the PLMN, a 2G network, a 3G network, a 4G network (e.g., a LTE network), a 5G network, and/or another network. Additionally or alternatively, network 170 may include a WAN, a MAN, a telephone network (e.g., the Public Switched Telephone Network (PSTN)), an ad hoc network, an intranet, the Internet, a fiber optic-based network, and/or a combination of these or other types of networks.

SAS 180 may include one or more devices that process requests for subscriber authentication services. For example, SAS 180 may receive, from PGW 120 and/or HSS/AAA server 140, device data associated with sending device 110. The device data may be acquired when a session is established (e.g., using a NAT operation) via service provider network 160 to transmit the MMS message from sending device 110. For example, PGW 120 and/or HSS/AAA server 140 may forward an identity, an MDN, a billing address, payment information, or other data associated with sending device 110 to SAS 180. SPC 180 may also receive the tagging data from MMS message tagger 130 and may store data associating the tagging data with the device data.

SAS 180 may receive, from MMSC 150, a request to authenticate an attribute associated with sending device 110. As previously described, the authentication request from MMSC 150 may include at least a portion of the tagging data and device data extracted from the MMS message. SAS 180 may determine whether the tagging data is valid (e.g., has not expired, etc.). In addition or alternatively, SAS 180 may perform a look up operation using the tagging data to obtain the stored device data associated with sending device 110 (e.g., the device data received from PGW 120 and/or HSS/AAA server 140 in connection with managing the transmission of the MMS message). SAS 180 may provide, to MMSC 150, a notification regarding whether the retrieved device data (associated with the tagging data) matches the device data attracted from the MMS message.

The quantity of devices and/or networks included in environment 100, as illustrated in FIG. 1, is provided for explanatory purposes only. In practice, environment 100 may include additional devices and/or networks, fewer devices and/or networks, different devices and/or networks, or differently arranged devices and/or networks than those illustrated in FIG. 1. Also, in some implementations, one or more of the devices of environment 100 may perform one or more functions described as being performed by another one or more of the devices of environment 100. Additionally, devices of environment 100 may interconnect via wired connections, wireless connections, or a combination of wired and wireless connections.

Figure 2:
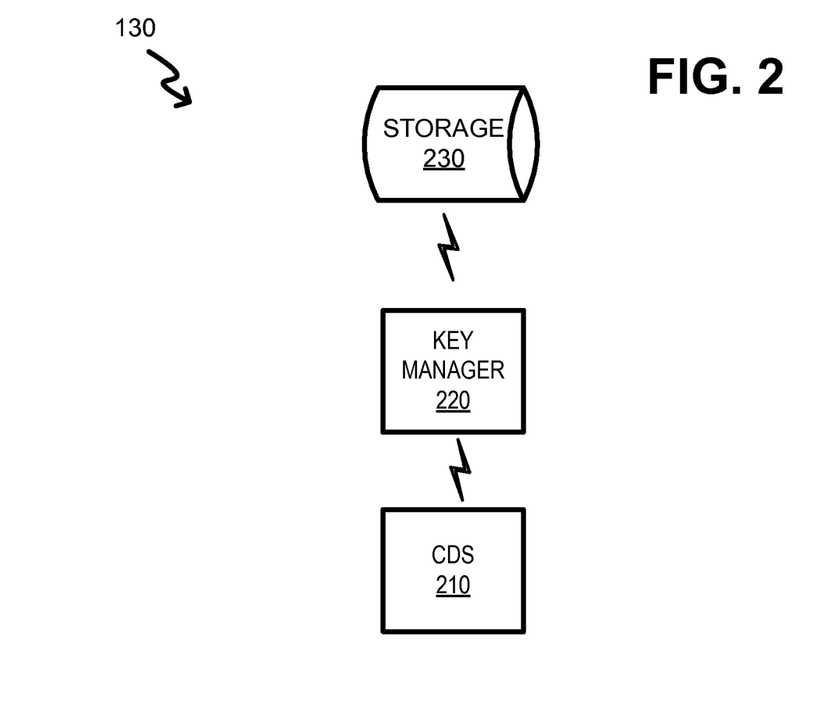
FIG. 2 is a diagram of exemplary components of an MMS message tagger of the environment in FIG. 1.

FIG. 2 is a diagram of exemplary components included in MMS message tagger 130. As shown in FIG. 2, MMS message tagger 130 may include, for example, a content management system (CMS) 210, a key manager 220, and storage 230.

CMS 210 may include one or more devices to process requests related to multimedia content. For example, CMS 210 may monitor and/or examine flows of packets (e.g., packet headers, trailers, payloads, etc.) received from PGW 120. CMS 210 may, for example, use deep packet inspection (DPI) techniques and/or some other inspection technique to identify an MMS message received, via PGW 120, from sending device 110.

CMS 210 may receive, from sending device 110 and/or HSS/AAA server 140, session information that includes information associated with NAT bindings for sending device 110 and/or information regarding an associated a subscriber. CMS 210 may obtain, from the session information, an identifier associated with sending device 110 (e.g., a mobile directory number (MDN) and/or some other identifier associated with sending device 110). CMS 210 may provide a request for a key to key manager 220 and may receive the key (also referred to as a "salt") from key manager 220.

CMS 210 may also, or alternatively, use a mechanism to generate the tagging data, based on the key and/or the identifier. The mechanism may, for example, correspond to a cryptographic hash function and/or some other mathematical function. For example, the mechanism may correspond to a one-way cryptographic hash function (e.g., a hash-based message authentication code (HMAC) secure hash algorithm (SHA) HMAC-SHA-256, etc.) and/or some other mathematical function. CMS 210 may insert the tagging data into the MMS message to create a modified MMS message. In one example, CMS 210 may insert the tagging data into a field within a packet included in the MMS message (e.g., in a header, a trailer, a payload, etc.) to create the modified MMS message. The tagging data may be valid for a period of time during which the key is valid.

Key manager 220 may include one or more devices that generate a key to be used to generate the tagging data. For example, key manager 220 may receive, from CMS 210 and/or SAS 180, a request for a key associated with sending device 110. The request may, in one example, include the identifier associated with sending device 110. Key manager 220 may obtain and/or generate the key that includes a string of alphanumeric characters and/or symbols. Key manager 220 may, for example, generate and/or obtain a random value and may generate the key based on the random value (e.g., using a mechanism, such as a cryptographic hash function and/or some other mathematical function, etc). In one example, a key, may be valid for a period of time (e.g., 1 hour, 12 hours, 1 day, 3 days, 7 days, 14 days, etc.) after which the key is to expire. The period of time may be predetermined by key manager 220 and/or an operator of MMS message tagger 130 and/or key manager 220. Key manager 220 may provide the key to CMS 210 and/or SAS 180. Key manager 220 may also provide a notification, to CMS 210 and/or SAS 180, when the key has expired. In one example, key manager 220 may generate the tagging data based on the identifier of sending device 110 (e.g., the MDN, etc.) and/or the key, and key manager 220 may provide the tagging data to CMS 210.

Storage 230 may include one or more devices that store identifiers, and/or tagging data associated with sending device 110. Storage 230 may also store session information, MMS messages (e.g., received from sending device 110), etc.

Figure 3:
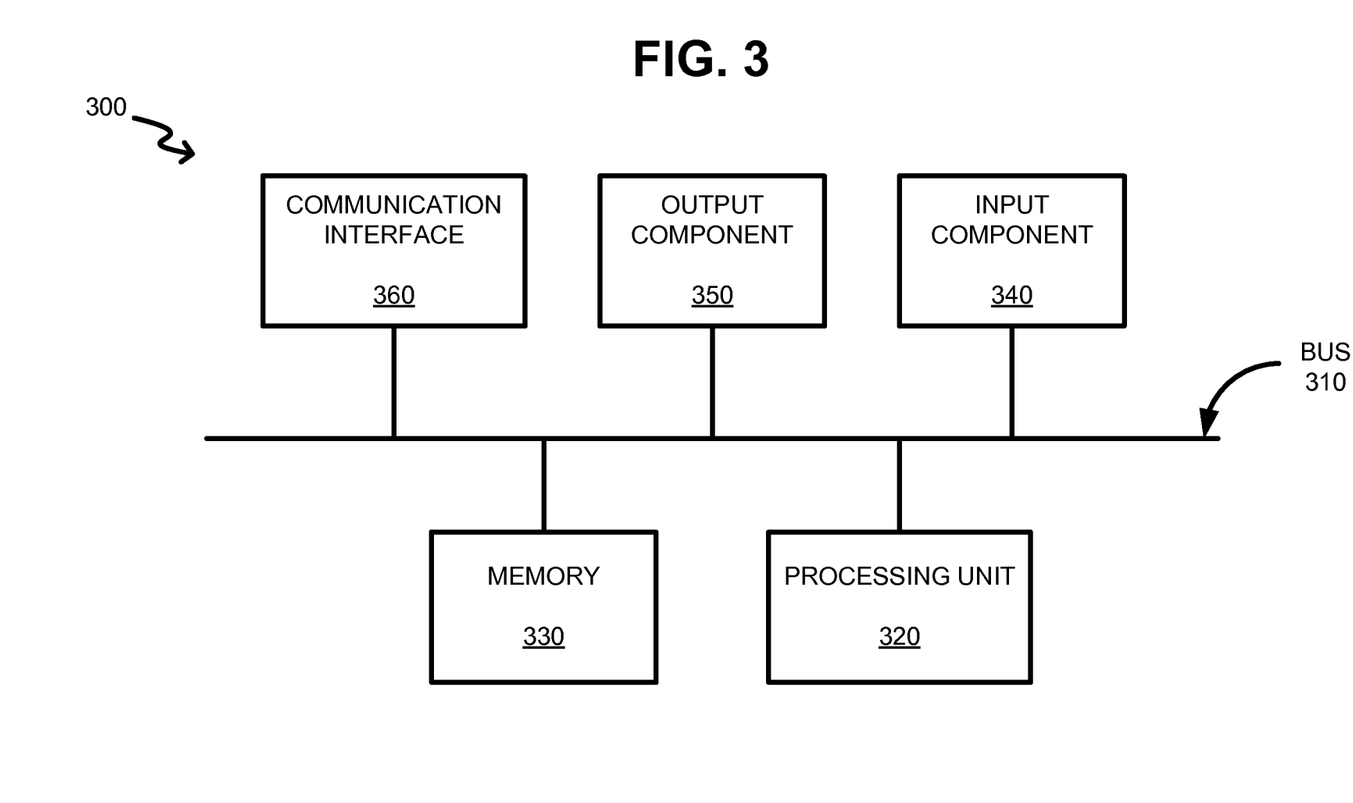
FIG. 3 is a diagram of exemplary components of one or more of the devices of FIG. 1 and/or of the MMS message tagger of FIG. 2.

FIG. 3 is a diagram of exemplary components of a device 300 that may be similar to, or the same as, devices that correspond to sending device 110, PGW 120, MMS message tagger 130, HSS/AAA server 140, MMSC 150, SAS 180, recipient device 190, CMS 210, key manager 220, storage 230, etc. Alternatively, each of sending device 110, PGW 120, MMS message tagger 130, HSS/AAA server 140, MMSC 150, SAS 180, recipient device 190, CMS 210, key manager 220, and storage 230 may include one or more devices that are similar to, or the same as, device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include one or more processors, microprocessors, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as service provider network 160 and/or network 170. In one implementation, communication interface 360 may be a logical component that includes input and output ports, input and output systems, and/or other input and output components that facilitate the transmission of data to other devices.

Device 300 may perform certain operations described herein. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. For example, device 300 may include one or more switch fabrics instead of, or in addition to, bus 310. In another example, in some implementations, a display may not be included in device 300. In these situations, device 300 may be a "headless" device that does not include input component 340. Additionally or alternatively, one or more operations described as being performed by a particular component of device 300 may be performed by one or more other components, in addition to or instead of the particular component of device 300.

Figure 4A:
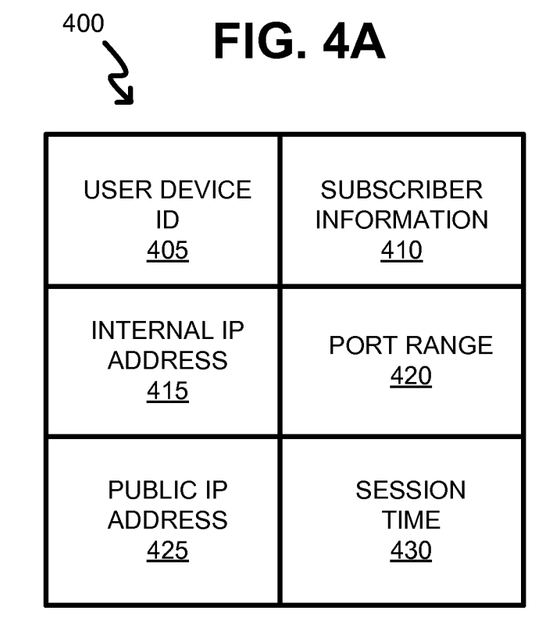
FIG. 4A is a diagram of an exemplary data structure that stores information associated with a network address translation (NAT) operation.

FIG. 4A is a diagram of an exemplary data structure 400 that may store information associated with a NAT operation related to sending an MMS message. In one example, data structure 400 associated with a packet that is provided, by PGW 120, to MMS message tagger 130. As shown in FIG. 4A, data structure 400 may include a user device identifier (ID) field 405, a subscriber information field 410, an internal Internet Protocol (IP) address field 415, a port range field 420, a public IP address field 425, and a session time field 430.

User device ID field 405 may store information associated with a particular sending device 110. For example, the information associated with the particular sending device 110 may include a device identifier (e.g., an international mobile equipment identity (IMEI), an electronic serial number (ESN), a mobile equipment identifier (MEID), etc.), an address (e.g., an Internet protocol (IP) address, a media access control (MAC) address, etc.), etc.

Subscriber information field 410 may store information associated with a subscriber associated with sending device 110. The information associated with the subscriber may, for example, include subscriber identifier (e.g., a MDN, a landline director number (LDN), a subscriber identity module (SIM) uniform resource identifier (URI), a mobile identification number (MIN), an international mobile subscriber identity (IMSI), a mobile subscriber integrated services digital network (MSISDN) identifier, a national access identifier (NAI), etc.) and/or other information associated with the subscriber.

Internal IP address field 415 may store an internal IP address associated with sending device 110. Port range field 420 may store one or more port identifiers associated with the internal IP address. Public IP address field 425 may store a unique public IP address, associated with sending device 110, that corresponds to a private IP address associated with sending device 110. Session time field 430 may store information that identifies when information, stored within data structure 400, expires.

It should be appreciated, however, that data structure 400 in FIG. 4A is provided merely for purposes of clarity of presentation and the illustrated configuration of data structure 400 is provided in FIG. 4A for explanatory purposes only. In practice, data structure 400 may include additional, fewer, or different elements than those illustrated in FIG. 4A.

Figure 4B:
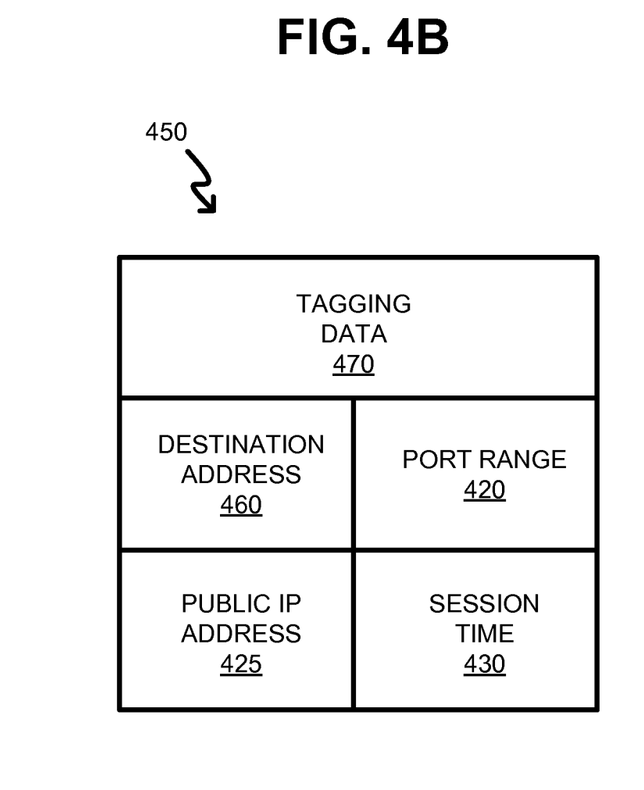
FIG. 4B is a diagram of exemplary data structure that stores information associated with an MMS message that includes tagging data.

FIG. 4B is a diagram of an exemplary data structure 450 that may store information associated with an MMS message that has been modified to include tagging data. In one example, data structure 450 may correspond to a packet, in the MMS request, that was modified by MMS message tagger 130 to include the tagging data. As shown in FIG. 4B, data structure 450 may include a collection of fields, such as fields 420-430 of FIG. 4A, along with a destination address field 460 and the tagging data field 470.

Destination address field 460 may store information identifying MMSC 150 and/or recipient device 190. For example, the information identifying MMSC 150 may correspond to a network address and/or identifier associated with MMSC 150. Tagging data field 470 may store tagging data for sending device 110. For example, tagging data field 470 may store the tagging data, associated with sending device 110, that is generated by MMS message tagger 130 when processing an MMS message received from sending device 110.

It should be appreciated, however, that data structure 450 in FIG. 4B is provided merely for purposes of clarity of presentation and the illustrated configuration of data structure 450 is provided in FIG. 4B for explanatory purposes only. In practice, data structure 450 may include additional, fewer, or different elements than those illustrated in FIG. 4B.

Figure 4C:
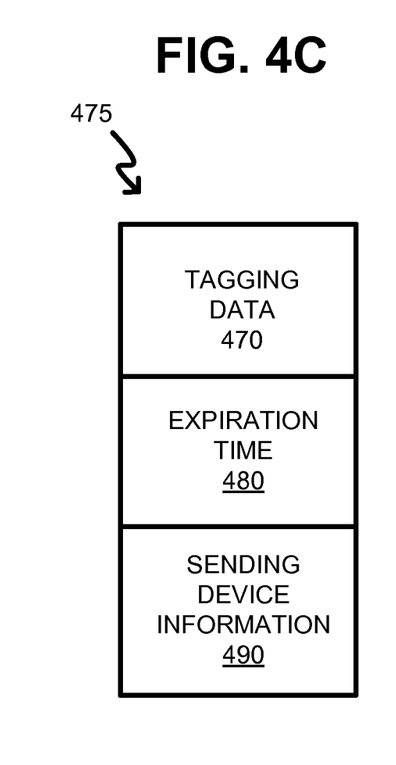
FIG. 4C is a diagram of a data structure that stores information used to provide targeted content and/or an authentication service.

FIG. 4C is a diagram of a data structure 475 that may store data associating tagging data information used to provide targeted content and/or an authentication service. In one example, data structure 475 may be stored in storage 230 and/or SAS 180. As shown in FIG. 4C, data structure 475 may include a collection of fields, such as tagging data field 470 of FIG. 4B, along with an expiration time field 480 and a sending device information field 490.

Expiration time field 480 may store information that identifies a time at which the tagging data expires, and sending device information field 490 may store information associated with sending device 110 (e.g., an identifier such as a MDN, a LDN, a SIM URI, a MIN, an IMSI, a MSISDN, a NAI, etc.), obtained in a manner similar to that described above with respect to field 410 of FIG. 4A. For example, data stored in sending device information field 490 may be obtained by MMS message tagger 130 from a subscriber profile (e.g., stored by HSS/AAA server 140) based on other information associated with sending device 110.

It should be appreciated, however, that data structure 475 in FIG. 4C is provided merely for purposes of clarity of presentation and the illustrated configuration of data structure 475 is provided in FIG. 4C for explanatory purposes only. In practice, data structure 475 may include additional, fewer, or different elements than those illustrated in FIG. 4C.

Figure 5:
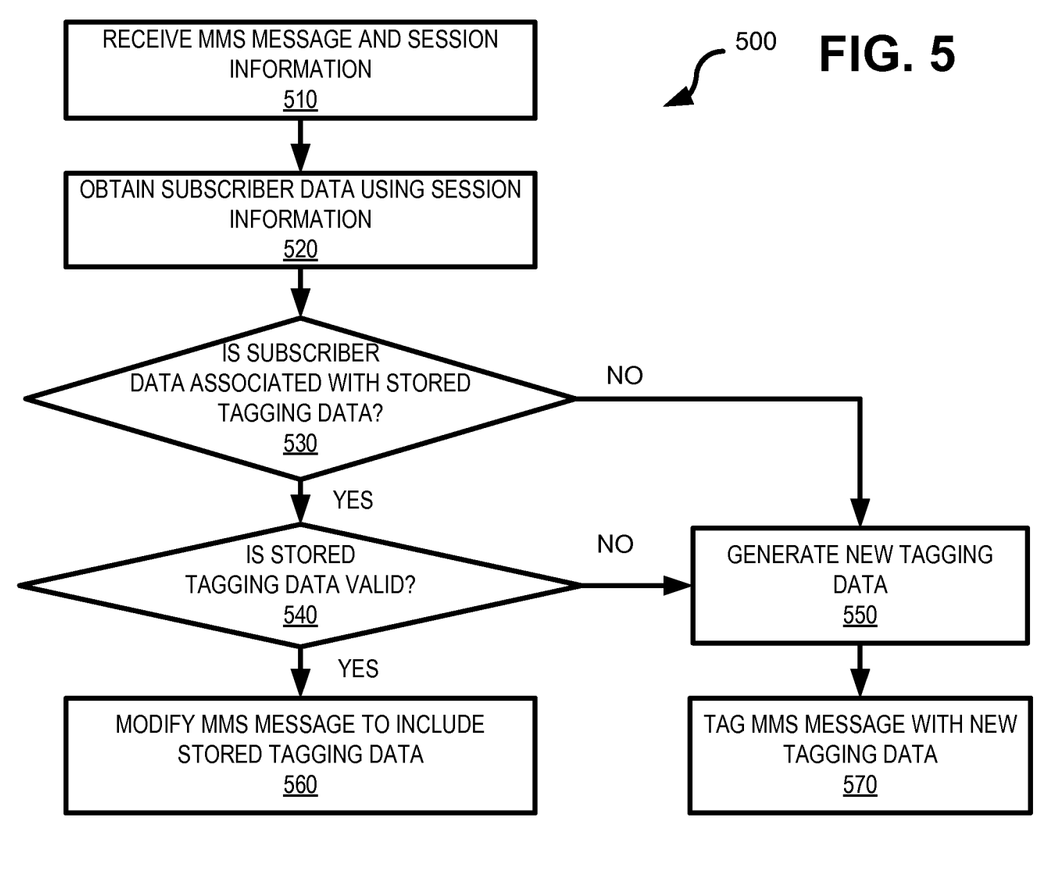
FIG. 5 is a flow chart of an exemplary process for adding tagging information to an MMS message to form a modified MMS message.

FIG. 5 is a flow chart of an exemplary process 500 for generating a modified MMS message using tagging data. In one exemplary implementation, process 500 may be performed by MMS message tagger 130. In another exemplary implementation, some or all of process 500 may be performed by a device or collection of devices separate from, or in combination with, MMS message tagger 130.

As shown in FIG. 5, process 500 may include receiving an MMS message and session information for a session associated with sending device 110 (block 510). For example, sending device 110 may send an MMS message via a session over service provider network 160 that is handled by PGW 120 and/or HSS/AAA server 140. As described above with respect to FIG. 4A, MMS message tagger may receive a packet that includes or is accompanied by data structure 400 that stores information associated with a NAT operation related to sending the MMS message.

In the description below, the information associated with sending device 110 will be described as the MDN for explanatory purposes, but it should be appreciated other device data may be used. For example, the information associated with sending device 110 may include an associated IMSI, SIM URI, MIN, MSISDN, LDN, NAI, etc.

For example, PGW 120 may obtain the MDN from the MMS message, and PGW 120 may transmit the MDN to HSS/AAA server 140 to authenticate sending device 110 based on the MDN. When HSS/AAA server 140 authenticates the sending device 110, PGW 120 may also identify an internal IP address and/or a port range to be used by a service provider network (e.g., service provider network 160). PGW 120 may create a NAT binding, associated with sending device 110, by assigning the internal IP address and/or the port range to sending device 110. Additionally or alternatively, PGW 120 may associate, with the internal IP address and/or the port range, a unique public IP address to be used by a network other than the service provider network (e.g., network 170). PGW 120 may also identify a time period for which the internal IP address, the public IP address, and/or the port range can be used. Additionally or alternatively, PGW 120 may store, as NAT bindings and in a memory associated with PGW 120, information obtained as a result of the NAT operation. For example, the NAT bindings may include the internal IP address, the port range, the public IP address, etc. as shown in FIG. 4A.

In block 510, PGW 120 and/or HSS/AAA server 140 may transmit session information to MMS message tagger 130 (e.g., to CMS 210), and this session information may include the MDN and/or the NAT bindings. In one example, PGW 120 and/or HSS/AAA server 140 may transmit the session information in the form of a packet (sometimes referred to as a "pilot packet").

Continuing with FIG. 5, process 500 may include obtaining an identifier, associated with the sending device 110, from the session information (block 520). For example, MMS message tagger 130 may monitor flows of MMS-related traffic, received from PGW 120, by examining packets (e.g., packet headers, packet trailers, payloads, etc.) included within the MMS-related traffic to identify the session information (e.g., the pilot packet).

In one implementation, MMS message tagger 130 may obtain, from the session information, data identifying a device type associated sending device 110 and/or an application used to generate the MMS message. MMS message tagger 130 may determine whether tagging data is supported by the identified device type of sending device 110 and/or the application. If the tagging data is not supported, MMS message tagger 130 may forward the MMS message without adding the tagging data (e.g., without modifying the MMS message).

As further shown in FIG. 5, process 500 may include MMS message tagger 130 determining if sending device 110 is associated with stored tagging data (block 530). For example, MMS message tagger 130 may access storage 230 to determine if tagging data has been previously generated for sending device 110 (e.g., for another packet associated with the MMS message or for another MMS message from sending device 110). As described above with respect to FIG. 4C, MMS message tagger 130 may access data structure 475 to acquire tagging data 470 associated with sending device information 490. If sending device 110 is associated with stored tagging data (block 530-Yes), MMS message tagger 130 may determine if the stored is valid (block 540). For example, MMS message tagger 130 may access data structure 475 to determine if expiration time 480, associated with stored tagging data 470, has passed. In another example, MMS message tagger 130 may determine if stored tagging data 470 reflects changes in sending device 110 and/or an associated device profile. For example, tagging data 470 may change to reflect a different service and/or setting associated with sending device 110.

Continuing with FIG. 5, if sending device 110 is not associated with stored tagging data (block 530-No) or the stored tagging data is invalid (block 540-No), process 500 may further include generating tagging data associated with sending device 110 (block 550). For example, CMS 210 may provide a key request to key manager 220, and the key request 620 may include the MDN or other identifying data associated with sending device 110. Key manager 220 may generate and/or obtain a random value for generating a key. For example, as described above with respect to FIG. 2, key manager 220 may use a cryptographic hash function and/or some other mathematical function to generate the key based on the random value. Key manager 220 may further determine a time when key 625 and/or the resulting tagging data expires. CMS 210 may use the key (provided by key manager 220) to generate the tagging data. For example, CMS 210 may use a cryptographic hash function and/or some other mathematical function to generate the tagging data based on the key and/or data associated with the subscriber and/or sending device 100. The tagging data may correspond to a string of alphanumeric characters and/or symbols that is valid for a predetermined period of time (e.g., 1 hour, 12 hours, 1 day, 3 days, 7 days, 14 days, etc.) that is tracked by key manager 220. Additionally or alternatively, key manager 220 may use the MDN and/or the key to generate the tagging data and may provide the tagging data to CMS 210.

As further shown in FIG. 5, if the stored tagging data is valid (block 540-Yes), MMS message tagger 130 may modify the MMS message with the stored tagging data to form a modified MMS message (block 560). Alternatively, if tagging data is generated in block 550, MMS message tagger 130 may modify the MMS message with the generated tagging data to form the modified MMS message (block 570). For example, as described above with respect to FIG. 4B, MMS message tagger 130 may generate a data structure 450 that modifies one or more packets from the MMS message to include tagging data 470. The tagging data may be acquired from storage 230 (e.g., from data structure 475). In block 560 or 570, CMS 210 may store the tagging data in a field of a packet associated with the MMS message. CMS 210 may, for example, store the tagging data in a field associated with a header (e.g., a HTTP header) of the packet. Alternatively, CMS 210 may store the tagging data in a trailer, a payload, and/or some other part of the packet. CMS 210 may transmit the modified MMS message to the MMSC 150 for processing.

Figure 6:
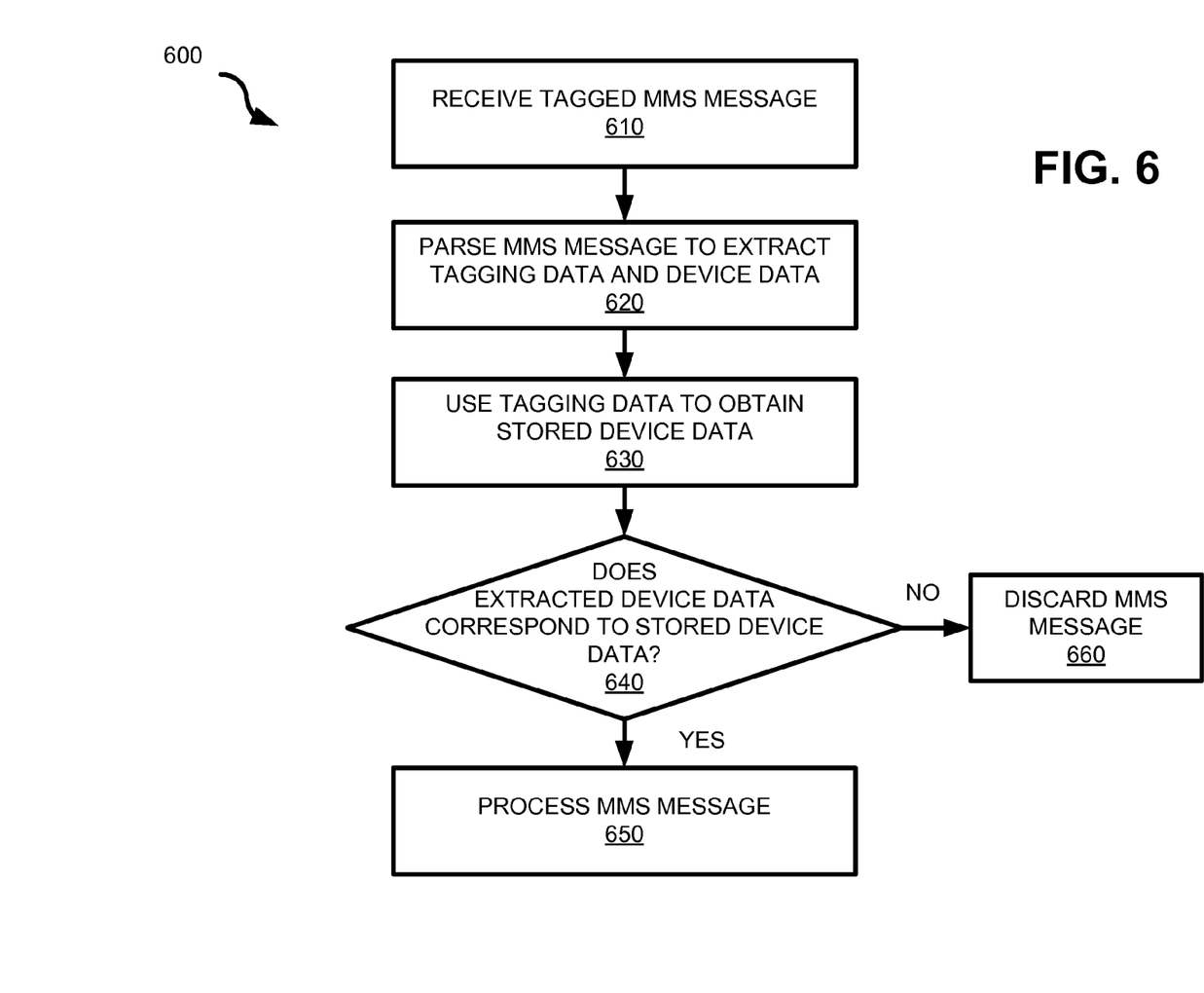
FIG. 6 is a flowchart of an exemplary process for authenticating a sending device associated with the modified MMS message generated in the process of FIG. 5.

FIG. 6 is a flow chart of an exemplary process 600 for processing the modified MMS message. In one example implementation, process 600 may be performed by MMSC 150. In another implementation, some or all of process 600 may be performed by a device or collection of devices separate from or in combination with MMSC 150.

As shown in FIG. 6, process 600 may include MMSC 150 receiving the modified MMS message (block 610), and MMSC 150 parsing the MMS message to extract the tagging data and data identifying an alleged source for the MMS message (block 620). For example, MMSC 150 may receive a packet associated from the modified MMS message from MMS message tagger 130. As described above with respect to FIG. 4B, the packet associated with the modified MMS message may includes tagging data 470 and public IP address 425. In another implementation, MSCS 150 may analyze multimedia content included in the modified MMS message (e.g., carried in a payload section of the packet) to identify the source device for the MMS message. For example, the multimedia content may include device data identifying a device that obtained and/or captured the multimedia content.

In another example, if the modified MMS message does not include information identifying sending device 110 (e.g., if sending device 110 is located within a private virtual network (VPN), and the VPN removes identifying data from the MMS message identifying sending device 110), MMSC 150 may communicate with PGW 120 and/or HSS/AAA server to access device data (e.g., stored in a subscriber profile) associated with sending device 110.

Continuing with FIG. 6, process 600 may also include MMSC 150 using the tagging data to obtain device information associated with sending device 110 (block 630). For example, SAS 180 may store data linking (1) data received from PGW 120 and/or HSS/AAA server 140 identifying sending device 110 (e.g. session data regarding the transmission of the MMS message from sending device 110); and (2) tagging data received from MMS message tagger 130. MMSC 150 may forward the tagging data (extracted from the modified MMS message) to SAS 180 to obtain the stored device data. For example, MMSC 150 may use the tagging data to obtain a LDAP password for accessing the device data stored by SAS 180. In another example, MMSC 150 may access the stored device data (e.g., as contained in data structure 475) via storage 230 included in MMS message tagger 130.

As further shown in FIG. 6, process 600 may include MMSC 150 comparing the device data extracted from the MMS message and the stored device data obtained using the tagging data (block 640). If the device data extracted from the MMS message (identifying a source device associated with the multimedia content) and the stored device data obtained using the tagging data (identifying sending device 110 that sent the MMS message) match (block 640-Yes), MMSC 150 may process the MMS message to enable recipient device 190 to access the associated multimedia content (block 650). Otherwise, if MMSC 150 determines that the device data extracted from the MMS message does not correspond to the stored device data obtained using the tagging data (block 640-No), MMSC 150 may discard the MMS message without further processing (e.g., without enabling recipient device 190 to access the multimedia content associated with the MMS message).

Systems and/or methods, described herein, enable MMSC 150 to verify that an MMS message correctly identifies sending device 110 using tagging data that reliably identifies sending device 110 without exposing private data associated with sending device 110.

While a series of blocks has been described with regard to processes 500 and 600 in FIGS. 5 and 6, the order of the blocks may be modified in other implementations. Further, non-dependent blocks may be performed in parallel. In addition, processes 500 and 600 may include additional, fewer, and/or different blocks. For example, process 600 may further include MMSC 150 blocking MMS messages from sending device 110 during a first time period if MMSC 150 blocks more than a threshold number of MMS messages from sending device 110 during a second, prior time period. In another example, MMSC 150 may update the MMS message to correctly identify sending device 110 (e.g., to replace device data extracted from the MMS message with device data recovered using the tagging data) and may process the updated MMS message to enable recipient device 190 to access associated multimedia content.

Furthermore, various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a processor associated with a multimedia messaging service (MMS) center (MMSC), an MMS message associated with forwarding multimedia content to a recipient device, wherein the multimedia content is associated with an identifier for a source device, the MMS message includes tagging data, and the tagging data is generated based on a numerical key and an identifier for a sending device that transmits the MMS message;
parsing, by the processor, the MMS message to determine the identifier for the source device and the tagging data;
obtaining, by the processor, the identifier for the sending device using the tagging data;
determining, by the processor, whether the source device corresponds to the sending device;
processing, by the processor and when the source device corresponds to the sending device, the MMS message to enable the recipient device to access the multimedia content; and
discarding, by the processor, the MMS message when the source device and the sending device differ.

2. The method of claim 1, wherein the identifier for the sending device is determined based on a network address translation (NAT) operation associated with transmitting the MMS message from the sending device.

3. The method of claim 2, wherein the NAT operation is associated with establishing a session for transmitting the MMS message from the sending device, and the identifier for the sending device is determined based on information associated with the session.

4. The method of claim 1, wherein the key is determined based on a random number, and the key is valid for a period of time.

5. The method of claim 4, wherein the tagging data is created from the key and the identifier for the sending device using a one-way cryptographic hash function, and
wherein the tagging data is valid for the period of time.

6. The method of claim 1, wherein obtaining the identifier for the sending device using the tagging data includes:

forwarding, to a subscriber profile controller (SPC), a first message that includes the tagging data, wherein the SPC stores data associating the tagging data and the identifier for the sending device, and receiving, from the SPC, a second message that includes the identifier for the sending device.

7. The method of claim 6, wherein forwarding the first message to the SPC includes accessing, using a Lightweight Directory Access Protocol (LDAP) interface, data at the SPC that stores the identifier for the sending device.

8. A system comprising:

a memory configured to store instructions; and a processor configured to execute one or more of the instructions to:

receive a multimedia messaging service (MMS) message associated with forwarding multimedia content to a recipient device, wherein the multimedia content is associated with an identifier for a source device, the MMS message includes tagging data, and the tagging data is generated based on a numerical key and an identifier for a sending device that transmits the MMS message, parse the MMS message to determine the identifier for the source device and the tagging data, obtain the identifier for the sending device using the tagging data, determine whether the source device corresponds to the sending device, process, when the source device corresponds to the sending device, the MMS message to enable the recipient device to access the multimedia content, and discard the MMS message when the source device and the sending device differ.

9. The system of claim 8, wherein the identifier for the sending device is determined based on a network address translation (NAT) operation associated with transmitting the MMS message from the sending device.

10. The system of claim 9, wherein the NAT operation is associated with establishing a session for transmitting the MMS message from the sending device, and the identifier for the sending device is determined based on information associated with the session.

11. The system of claim 8, wherein the tagging data is created from the key and the identifier for the sending device using a one-way cryptographic hash function.

12. The system of claim 8, wherein the processor, when obtaining the identifier for the sending device using the tagging data, is further configured to:

forward, to a subscriber profile controller (SPC), a first message that includes the tagging data, wherein the SPC stores data associating the tagging data and the identifier for the sending device, and receive, from the SPC, a second message that includes data associated with the identifier for the sending device.

13. The system of claim 12, wherein the processor, when forwarding the first message to the SPC, is further configured to:

access, using a Lightweight Directory Access Protocol (LDAP) interface, data maintained by the SPC that stores the identifier for the sending device.

14. The system of claim 8, wherein the processor is further configured to:

determine that more than a threshold quantity of MMS messages from the sending device were discarded during a time period, receive another MMS message sent from the sending device, wherein the other MMS message includes other tagging data, and discard the other MMS message without processing the other tagging data and based on determining that more than the threshold quantity of MMS messages from the sending device were discarded during the time period.

15. A non-transitory computer-readable medium to store instruction comprising:

one or more instructions that, when executed by a processor associated with a multimedia messaging service (MMS) center, cause the processor to:

receive an MMS message associated with forwarding multimedia content to a recipient device, wherein the multimedia content is associated with an identifier for a source device, the MMS message includes tagging data, and the tagging data is generated based on a numerical key and an identifier for a sending device that transmits the MMS message, parse the MMS message to determine the identifier for the source device and the tagging data, obtain the identifier for the sending device using the tagging data, determine whether the source device corresponds to the sending device, process, when the source device corresponds to the sending device, the MMS message to enable the recipient device to access the multimedia content, and discard the MMS message when the source device and the sending device differ.

16. The non-transitory computer-readable medium of claim 15, wherein the identifier for the sending device is determined based on a network address translation (NAT) operation by a packet data network gateway (PGW), and wherein the NAT operation is associated with establishing a session transmitting the MMS message from the source device.

17. The non-transitory computer-readable medium of claim 16, wherein a home subscriber/authentication, authorization, and accounting (HSS/AAA) server uses data from the session to determine the identifier for the sending device in a subscriber profile associated with the sending device.

18. The non-transitory computer-readable medium of claim 15, wherein the tagging data is created from the key and the identifier for the sending device using a one-way cryptographic hash function.

19. The non-transitory computer-readable medium of claim 15, wherein the one or more instructions, when causing the processor to obtain the identifier for the sending device using the tagging data, further cause the processor to:

forward, to a subscriber profile controller (SPC), a first message that includes the tagging data, wherein the SPC stores data associating the tagging data and the identifier for the sending device, and receive, from the SPC, a second message that includes the identifier for the sending device.

20. The non-transitory computer-readable medium of claim 19, wherein the one or more instructions, when causing the processor to forward the first message to the SPC, further causes the processor to:

access, using a Lightweight Directory Access Protocol (LDAP) interface, data maintained by the SPC that stores the identifier for the sending device.

* * * * *